United States Patent [19]

Sullivan

[11] Patent Number: 4,826,215

[45] Date of Patent: May 2, 1989

[54] CLAMP

[76] Inventor: Samuel R. Sullivan, 5115 Border Dr., Oxon Hill, Md. 20745

[21] Appl. No.: 111,591

[22] Filed: Oct. 23, 1987

Related U.S. Application Data

[63] Continuation of Ser. No. 936,436, Dec. 1, 1986, abandoned.

[51] Int. Cl.[4] ............................................. F16L 35/00
[52] U.S. Cl. .......................................... 285/80; 285/8; 285/373
[58] Field of Search ...................... 285/8, 80, 419, 373; 270/232

[56] References Cited

U.S. PATENT DOCUMENTS

| | | | |
|---|---|---|---|
| 142,388 | 9/1873 | Goble | 285/419 X |
| 725,290 | 4/1903 | Speer | 285/80 X |
| 968,759 | 8/1910 | Fogg | 285/80 X |
| 1,112,189 | 9/1914 | Bartholomew | 285/80 |
| 1,369,913 | 3/1921 | Brunhoff | 285/373 X |
| 2,048,424 | 7/1936 | Caldwell | 70/232 |
| 2,725,246 | 11/1955 | Weinhold | 285/373 X |
| 3,284,121 | 11/1966 | Lyon | 285/80 X |
| 3,678,717 | 7/1972 | Eaton | 285/80 X |
| 4,358,140 | 11/1982 | Jonsson | 285/80 |
| 4,458,923 | 7/1984 | Burroughs | 285/8 |

FOREIGN PATENT DOCUMENTS 18085 of 1914 United Kingdom .................. 70/232

Primary Examiner—Dave W. Arola
Attorney, Agent, or Firm—Joseph A. Finlayson, Jr.

[57] ABSTRACT

A clamp for securing a hose connection. The clamp is a cylindrical shell which encases a hose connection and secures the connection from being disconnected by ordinary means.

1 Claim, 2 Drawing Sheets

CLAMP

This is a continuation, of application Ser. No. 936,436, filed Dec. 1, 1986, now abandoned.

BACKGROUND OF THE INVENTION

1. Field of the Invention

This invention relates to a hose clamp, and is more particularly directed towards a clamp that will secure a water hose to an outlet fixture, such as a faucet, and prevent removal of the hose therefrom by ordinary means.

2. Description of the Prior Art

When utilizing a water hose that is attached to outlets, such as a conventional faucet, in an outdoor environment, generally, the hose is attached to the outlet before use, and detached from the outlet after use. One principal reason for detaching the hose from the outlet after use is to prevent unauthorized removal of the hose from the outlet.

Heretofore, clamps have been used to secure hoses in varied type uses. An example of such a clamp is disclosed in U.S. Pat. No. 3,603,539, to Clegg. In the Clegg patent, an arcurate ring two part clamp member is fixed around a hose. A handle mechanism is attached to one part of the clamp member and is operated to compress the two parts of the clamp member into locking relationship with the hose.

Such a clamp is typical of the conventional devices used to secure hose, and would be entirely impractical for use in securing a water hose that is attached to a faucet.

SUMMARY OF THE INVENTION

It is a principal object of the present invention to provide a nevel clamp for securing hose connections.

It is a further object of the present invention to provide a clamp to firmly secure a hose attached to an outlet.

Still a further object of the present invention is to provide a clamp for securing a water hose that is attached to an outlet, such as a faucet, so that the hose cannot be detached from the outlet by ordinary means.

Other objects of the invention will be obvious to those skilled in the art on reading the application.

The above objects have been substantially achieved by employing a clamp, which includes a pair of symmetrical cylindrical half shells. The shells are joined to each other along one side of each shell's longitudinal axis by a first hinge so as to form a member which closes to a cylindrical shape along the respective opposite longitudinal side thereof. A flanged ear protrudes from the outer cylindrical surface of one shell. Correspondingly, an elongated movable collar is affixed to the outer surface of the respective other shell, by a second hinge, and is so aligned that when the pair of shells are in a closed relationship, the collar overextends the ear. A slot is provided in the collar that conveniently allows the ear to pass therethrough. The ear is also adapted with a suitable opening therein and may receive a conventional lock when the ear is in registry with the slot of the collar.

p BRIEF DESCRIPTION OF THE DRAWING

The invention will be more fully understood from the following detailed description of embodiments described herein, read in conjunction with the appended drawings.

DETAILED DESCRIPTION OF THE DRAWING

Figure 1:
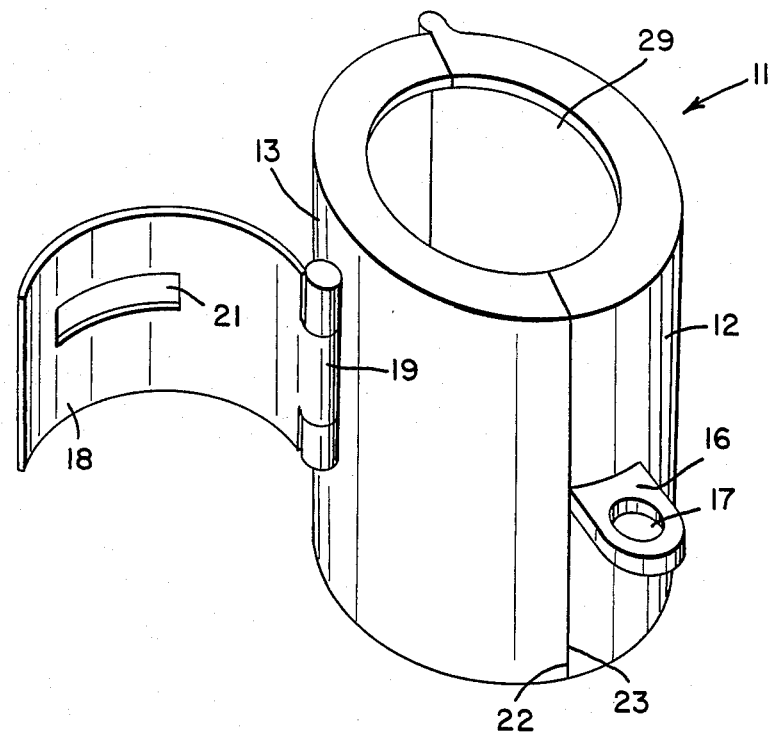
FIG. 1 is a perspective view of a clamp of the present invention, showing the device in a closed position.
Figure 2:
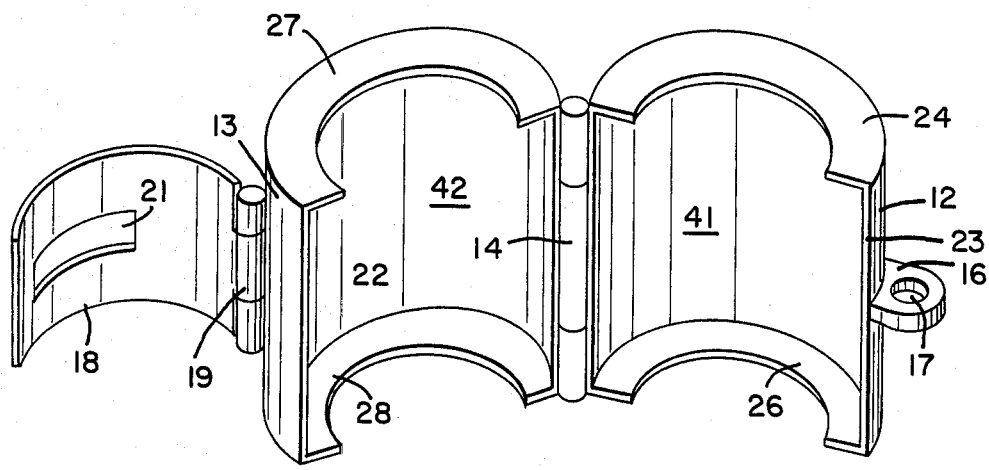
FIG. 2 is a similar view to that of FIG. 1, illustrating the device in an open position.

Referring to FIG. 1, a clamp, generally denoted as 11, includes a pair of cylindrical shells 12 and 13. The shell 12 is connected to the shell 13 by a first hinge 14 (FIG. 2)

The shell 12 has affixed thereto a protruding ear 16. The ear 16 has opening 17 therethrough.

Correspondingly, the shell 13 has attached thereto an elongated collar 18. The collar 18 is movably situated on the shell 13 via a second hinge 19. Also, the collar is provided with an elongated slot 21.

Figure 3:
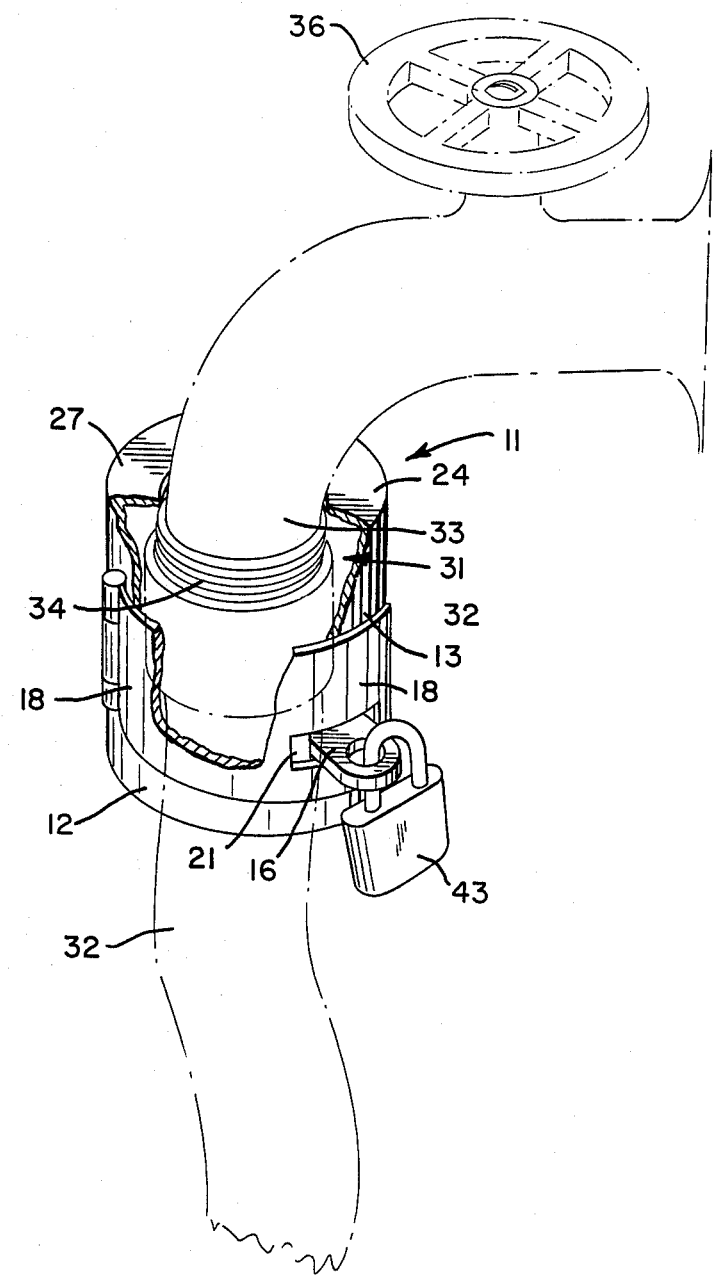
FIG. 3 is a perspective view, partially cut-away, partially in phantom, illustrating the invention clamped to a hose connection.

The shell 12 and the shell 13 are adapted to move about hinge 14 so that a side 22 of the shell 12 and a side 23 of the shell 13 desirably abut to form a closed engaging relationship (FIG. 1). The ear 16 is positioned on the shell 12 so as to align itself with the collar 18 on the shell 13. When the shell 12 and the shell 13 are in a closed engaging relationship, the collar 18 is adapted to move into overlying and engaging contact with the ear 16, by movement of the collar 18 along the hinge 19. In such a position, the ear 16 is adapted to pass through the slot 21 of the collar 18 (FIG. 3). The ear 16 passes through the slot 21 sufficiently so that the opening 17 also passes through the slot 21.

The clamp 11, when in a closed engaging position (FIG. 1), has a cavity 29 therethrough which is of suitable dimension for its intended inventive use, to be explained hereinafter.

The shell 12 has a top flange 24 (FIG. 2) and bottom flange 26 around its entire periphery thereof. Likewise, the shell 13 has a top flange 27 and a bottom flange 28 around its entire periphery.

In use, the clamp 11 (FIG. 1) is adapted to secure a hose connection 31 as illustrated in FIG. 3.

The connection 31 includes a suitable hose 32, such as a water hose, which is connected to a conventional pipe 33 via known means, such as common screw threads 34, affixed to the end of the hose and the pipe, respectively. The pipe 33, in turn, is connected to a water source (not shown), the flow of which can be regulated by turning a handle 36 connected to the pipe from a closed position to an open position in a well known manner.

The threaded portion 34 of the hose 32, and the pipe 33 is suitably of a cross-section dimension larger than the dimension of the hose and pipe, and are such size that they are unable to pass by the flange portions 24, 26, 27, and 28, (FIG. 2) of the cavity 29 (FIG. 1).

The clamp 11 (FIG. 2) is positioned about the connection 31 (FIG. 3) so that the hose 32, the pipe 33, and the common screw threads 34 are located within the cavity 29 (FIG. 1). The shell 12 and the shell 13 are thus, in a closed position about the connection 31 (FIG. 3). The cavity 29, as defined by the flanges 24 and 26 of the shell 12, and the flanges 27 and 28 of the shell 13 (FIG. 2), suitably has a cross-sectional dimension greater than the corresponding dimension of the hose 32 and the pipe 33, but less than the respective dimension of the common screw threads 34 (FIG. 3). Accordingly, the dimension of the cavity 29 (FIG. 1), as defined by the inner surface 41 of the shell 12, and the inner surface 42 of the shell 13 (FIG. 2) is greater than the cross-sectional dimension of the screw threads 34 (FIG. 3). Thus, the connection 31 is encased within the clamp 11 when the shell 12 and the shell 13 are in a closed position.

The collar 18 is then position to receive the ear 16 within the slot 21, thereof (FIG. 2). A lock 43, of any suitable type is placed through the opening 17 of the ear 16, and fastened, thereby locking the connection 31 within the clamp 11 (FIG. 3).

It should be readily apparent from the foregoing that the embodiments herein are disclosed accomplish the objects of the onvention herein before discussed. It should also be appreciated that other and further embodiments of the invention may be devised without departing from the basic concept herein described.

For example, the ear 16 (FIG. 2) may protrude longitudinally rather than transversely, as shown. Likewise, the slot 21 may be placed transversely on the collar 18 to form a complimentary engaging relationship with the ear 16.

Also, a plurality of hinge brackets may be substituted for the hinge 14, and the hinge 19 as shown in the drawing.

What is claimed is:

1. In a combination hose and faucet connection, wherein the hose is detachably connected to the faucet, a clamp secured about the connection to prevent detachment thereof, the clamp comprising:

a first half cylindrical shell;

a second half cylindrical shell, complementary to the first shell, adapted to coincide with and abut the first shell to form a cylinder having a first couity larger in size than the aforesaid connection, suitably to enclose the connection therein;

a first pair of flanges, each extending around the respective ends of the inner circumference of the first shell;

a second pair of flanges, each extending around the respective ends of the inner circumference of the second shell, the second pair of flanges complementary of the first pair of flanges, adapted to coincide with and abut the first pair of flanges to form a first opening at the ends of the aforesaid cylinder which is smaller in size than the aforesaid connection, thus preventing the enclosed connection from extending therethrough;

an elongated hinge that connects one side of the first shell to one side of the second shell for moving the first shell from a non engaging to an abutting engaging relationship with the second shell along the axial complementary side thereof to enclose the hose connection;

an ear fixedly connected to the first shell, the ear having an opening therein;

a collar, movably connected to the second shell, the collar having an opening therein, which is adapted to receive the ear affixed to the first shell when the second shell is in engaging relationship with the first shell; and a locking device to fasten the collar to the ear.

* * * * *